March 27, 1934.  V. MULHOLLAND  1,953,023
METHOD AND APPARATUS FOR MAKING GLASS
Filed Feb. 18, 1927
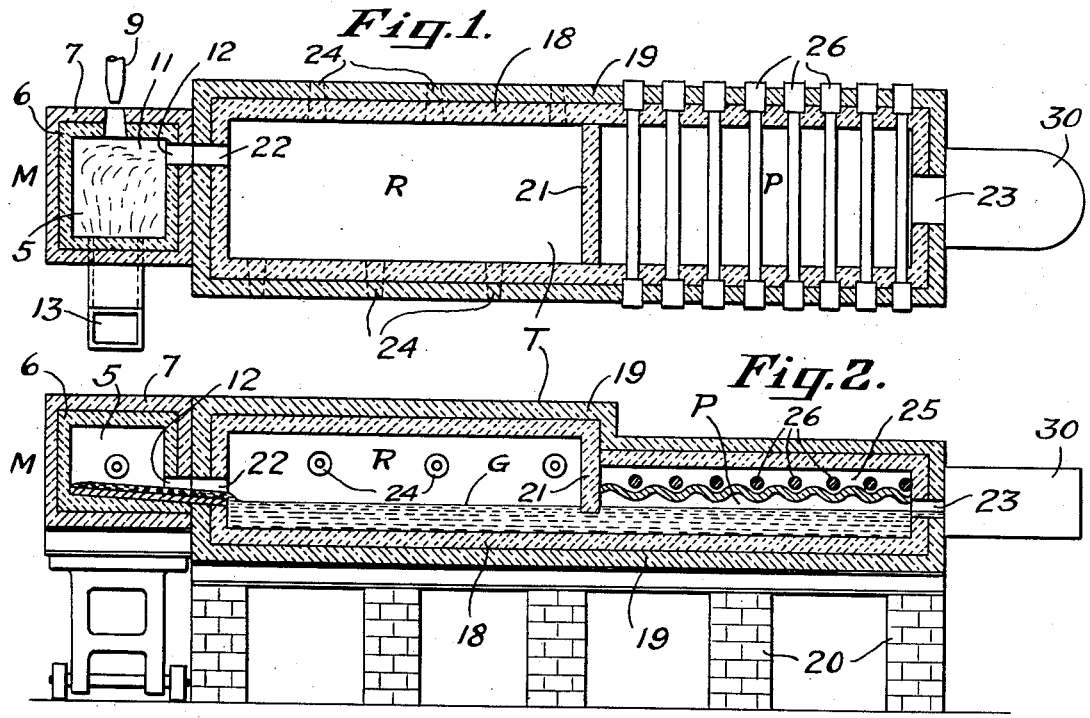
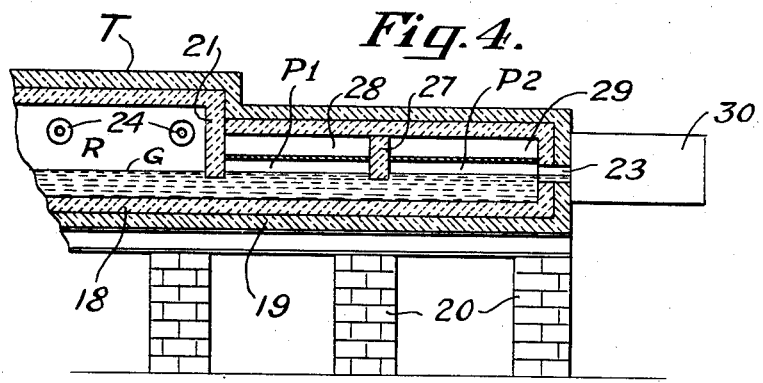
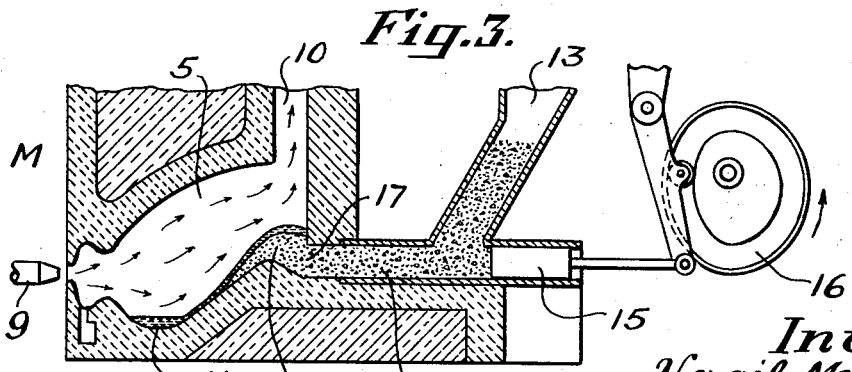
Witness:
A. A. Horn
Inventor
Vergil Mulholland
by Robson D Brown
Attorney.

Patented Mar. 27, 1934

1,953,023

UNITED STATES PATENT OFFICE 1,953,023

METHOD AND APPARATUS FOR MAKING GLASS

Vergil Mulholland, West Hartford, Conn., assignor to Hartford-Empire Company, Hartford, Conn., a corporation of Delaware Application February 18, 1927, Serial No. 169,213

15 Claims. (Cl. 49—54)

My invention relates to the art of glass working and more particularly to apparatus and methods for continuously producing molten glass from glass making material of the character suited to the subsequent ware formative operations.

I conceive that the process of making glass is divided into three more or less separate and distinct steps:

1. The "melting" or "fusing" step during which the batch of glass making material is fused and chemical reactions take place converting the original constituents into new compounds, usually silicates.

2. The "refining" or "finishing" step during which the compounds resulting from fusion are rediffused and the gases created by the breaking down of the original constituents and the included air are eliminated and the glass made homogeneous.

3. The "tempering" or "preparation" step during which the refined glass is brought to and maintained at a temperature adapted for the fabricating operations to be applied to the glass in the manufacture of glassware.

Heretofore continuous melting of glass has been carried on in large melting furnaces or tanks in which a unitary heat control is used as a means of regulating the heat conditions in the various portions of the tank. The tank comprises one chamber above the glass line and is separated below the glass line into two compartments by a bridge wall rising slightly above the level of the glass. These compartments communicate by a throat or passage below the glass level. This construction is such that heat applied to any portion of the tank has an effect in all parts of the tank.

The rear portion of the tank is usually referred to as the melting compartment and the forward portion as the refining chamber. The terms, however, are misleading as the operations of melting or fusing and refining are both substantially completed in the melting compartment while the refining compartment is used primarily to temper the refined glass to a temperature and viscosity suitable for the manipulations of the hand worker or the automatic feeders in the first steps of the ware formative operations.

The practice in the use of these continuous tanks has heretofore been to maintain glass a considerable depth as for instance from 36 to 48 inches. Glass batch is charged from above in considerable quantity into the rear portion of the melting compartment directly upon the previously melted glass already in that compartment. It is usual to charge these tanks at periods of from twenty to forty minutes and the charge is accordingly of considerable size. The glass batch is fused by heat applied to its upper surface. During the fusion the ingredients undergo chemical changes forming in the case of the usual silica glasses the various silicates of which it is ultimately composed. Upon fusion decomposition of the original constituents produces considerable amounts of gases and it becomes necessary to subject the glass to further heat treatment to free it of these gases and included air and to diffuse the various products of the chemical changes to render the glass homogeneous. This stage of the process is commonly known as "refining" and is carried on in the tanks now in use in the compartment in which the fusing or melting is done. In these tanks there is substantially no separation of the stages of fusing and refining, from which fact arise certain objections which are avoided by my invention.

After the treatment of the glass in the melting compartment it passes through the throat in the bridge wall into the working end of the tank, erroneously termed "the refining end", where it is permitted to cool until its temperature and viscosity are such as are required by the manufacturing operation. Because of the unitary control of the heat in the tank it is impossible to apply to each glass making operation the most efficient and economical heat condition and in practice the heat condition is always a compromise between the requirements of the three operations of fusing, refining and tempering.

The method of charging and fusing the glass heretofore used requires heating of unnecessarily large surfaces both of glass and tank structure and the practice of completing the refining operation in the melting compartment is wasteful and has a number of undesirable results affecting the quality of the glassware produced and the cost thereof. Similarly the use of a tempering or workout chamber in heat communication with the melting chamber not only is inefficient, but tends to the production of unsatisfactory ware.

Owing to the fact that the cross section of the tank is large and that the external surfaces of the tank are exposed to the atmosphere without insulation and are usually subjected to external artificial cooling, there are throughout radical temperature gradients from the surface to the bottom of the glass and from the center to the sides of the tank. In other words the glass at any particular transverse cross-section is not at uniform temperature. The difference in temperature may exist to such an extent that the exterior portions at the bottom and sides are so rigid that glass does not flow at all. It is thus apparent that part of the glass flows in channels, through other glass which is not flowing or which is flowing at a much slower rate. This channeling results in the formation of pockets of dead glass which upon occasions of variations in temperature may be softened to the extent that it is incorporated in the stream without becoming homogeneous therewith thus producing non-homogeneous glass at the working end. Further, this channeling often results in the movement forward of portions of the unmelted batch and destroys the accurate control of the application of the various glass making steps referred to, as the process of melting will, on these occasions, take place in a portion of the tank in which the process of refining should more particularly take place and where the temperature conditions may not be efficient for melting.

Further, due to the difference in temperature between the central portion of the glass in the tank and the portions against the walls, convection currents, transverse to the line of flow are developed, causing glass of a different nature and having different physical and chemical properties to mix with the glass flowing forward in the main channel, thus producing a non-homogeneous metal which produces difficulty in working and imperfect ware.

These transverse convection currents and heat gradients are not the only objectionable ones. It is also undesirable to have a rising heat gradient from rear to front of the tank or one which alternately rises and falls, as these gradients result in currents which advance the batch and glass out of the melting and refining portions of the tank before the respective operations are completed. In the prior art tank the lack of adequate control of heat conditions in the separate portions of the tank often results in these objectionable heat gradients and generally the problem of balance of heat conditions is a delicate one in this structure.

Because of the long and uncertain process required to properly melt and refine the glass, the tanks heretofore used have been of great size relative to their daily output; for instance, a tank having a daily output of 25 to 40 tons must maintain within it a hundred or more tons. The depth at which the glass is carried and the differences between the temperature of the walls of the tank and the glass are fruitful sources of difficulty which are largely avoided by my invention.

Among others, an object of my invention is to provide a method and apparatus for handling the glass in which the fundamental steps of (1) converting the raw batch to glass, (2) refining or finishing the melting operation, and (3) cooling and preparing the glass for working, are carried out independently and are separately heat controlled.

In general, my method comprises feeding of glass batch continuously to a melting chamber provided with a separately controlled heating means, supplying heat to the surface of the raw batch therein causing the glass, as melted, to drain on to the floor in thin layers and finally to flow out of the melting furnace into a refining or finishing chamber so that the finishing may be most rapidly completed. It consists further in controlling the heat in the "refining" or "finishing" chamber so that convection currents are minimized or avoided and to substantially eliminate all heat gradients save perhaps, one downwardly in the direction of flow of the glass through the refining chamber. It further includes passing the refined glass to a "preparation" or "tempering" compartment which is also provided with its individual heat control and in which the glass is uniformly brought to the working temperature and maintained thereat.

Among the advantages of my invention over the methods heretofore used are the following:

By its use the melting of the glass is more rapid and hence it permits a considerable reduction in the size of the tank structure while maintaining the same output. This reduction in size in turn (a) reduces the original cost of the apparatus, (b) decreases the area to be heated, (c) decreases heat losses when production is lowered and (d) generally lends to greater flexibility and efficiency of factory operations.

The reduction in size of the tank is accompanied by an increased ability to insulate and greater effectiveness in the use of insulation. The insulation not only further decreases heat losses and permits better temperature control through the several steps in the process, but greatly reduces the troublesome convection currents, which reduces the tendency of the glass to flow in channels. Full cross-sectional flow is further aided by the elimination of the restricted throat of the old tanks.

The separation of steps of the process, which is one of the main objects of my invention, permits the maintenance of the separate chambers and the carrying out of the different steps at the most efficient temperature for each step, which results in increased speed and the reduction in cost per ton of glass melted. This separation of the steps of the process also avoids the objectionable feature of the old art above mentioned in that it prevents unmelted batch from the melting chamber passing into the other chambers and the delivery of unrefined glass to the preparation or working end.

My process lends itself to the use of comparatively shallow baths of glass throughout the apparatus and this in turn has the advantages of increasing the speed of glass making, aiding in the elimination of convection currents, and increasing the control both of the flow and of the characteristics of the glass through the various stages of the operation.

Referring to the accompanying drawing:

Fig. 1 is a plan view mainly in section of one form of apparatus adapted to carry out my invention.

Fig. 2 is a vertical section of the same.

Fig. 3 is an enlarged sectional view of the melting chamber of the apparatus shown in Figs. 1 and 2, illustrating one method of delivering raw batch to the melting chamber, and Fig. 4 shows a modified form of the preparation or tempering chamber.

M represents generally a melting or fusing tank or compartment into which raw batch is delivered and wherein the step of fusing is performed. T represents generally a unitary tank structure comprising a refining compartment R and a preparation or tempering compartment P. The melting chamber M preferably constitutes a unitary structure separate from the refining and preparation chambers and is adapted for movement into and out of the position shown in Fig. 1 to permit substitution of new melting compartments. As this portion of the apparatus, being subjected to higher temperature, will wear faster than other portions of the apparatus, it is desirable that it may be replaced without excessive loss of use of the other portions of the apparatus. My invention comprehends the simultaneous use of a plurality of these melting units with the same refining and preparation chamber, if a higher rate of melting than can be obtained by a single unit be found desirable.

The melting tank M comprises an enclosed chamber 5 having walls, floor and roof 6, of high grade refractory material and insulated from the outside atmosphere, by insulation 7. The batch is continuously fed into the chamber by underfeed mechanism such as illustrated in Fig. 3 or in any other suitable manner, so as to maintain a small mass or masses 8 of batch on the floor of the chamber. The chamber is provided with any suitable heating means as for instance a gas burner 9, the control of which is individual to the melting chamber. A stack or chimney 10 with suitable dampers (not shown) may be provided to assist in the control of the heat in the chamber. As the glass is fused from the top of the mass 8 it drains from the mass over the floor, which preferably is made sloping, and into a trough or delivery chute 11 and hence out of the chamber through an opening 12 and into the refining chamber R.

The batch feeding mechanism (Fig. 3) comprises a chute 13 communicating with a suitable hopper through which the batch passes by gravity into a substantially horizontal passage 14. A reciprocating piston 15 continuously driven through suitable connections by a cam 16 periodically forces the batch through an opening 17 into the chamber 5 and under the mass 8. The rate of feed may be regulated by the selection and adjustment of various factors as the size of the passages 13 and 14 and the stroke and speed of the piston 15, so that the feed will be such as to replace the batch as melted to maintain a constant quantity of batch in the chamber at all times.

My method of feeding the batch into the melting chamber through an enclosed passage and under the masses of glass already in the chamber has a great advantage over the prior art method of dumping the batch into the tank from above. When the batch is dumped from above, the combustion gases passing over the glass at high velocity tend to separate the finer and lighter constituents from the heavier ones, and a considerable percentage of these light constituents are carried entirely out of the furnace through the flues. Thus, the chemical characteristics of the glass made by that method are uncertain. Also, the flues of the tank often become clogged by this material. In my method, as the batch is presented to the heat, it melts and to some extent forms a seal over the batch below it, so that when new batch is charged from beneath, there is no separation and escape of the finer constituents, and hence a batch of determined composition is always melted.

If desired, the uniformity of the batch may be further assured by the addition thereto of a small percentage of water.

There is an additional advantage in positively forcing the glass under the batch in that each forward stroke of the pusher or piston causes the surface of the mass in the furnace to crack slightly as the mass is swelled from below and these cracks permit a deeper penetration of the heat applied to the glass and thus facilitate the melting operation.

The chambers R and P are preferably formed as parts of a single structure T which comprises walls, roof and bottom of high grade refractory material 18 surrounded by suitable insulation 19 and supported on suitable supports 20. This structure is divided internally by a refractory partition 21 extending entirely across the chamber and projecting from the top downward to a point just below the glass line G and serving to divide the structure into heat separated chambers R and P. At one end of the structure is provided an opening 22 through which glass from the melting chamber may pass into the refining chamber and at the other end with suitable ring holes or feeder openings 23.

Chamber R is provided with suitable heating elements, illustrated in Figs. 1 and 2 as gas burners 24, which elements are controlled independently of the heating means in the chambers M and P and preferably have each its separate control. This arrangement permits the selection and maintenance in each zone of the chamber of the most efficient heat condition and renders that condition independent of conditions elsewhere in the apparatus. The chamber P constitutes the preparation or tempering chamber and is provided above the glass level with a suitable chamber 25 by means of which suitable heat conditions may be maintained. As illustrated in Figs. 1 and 2 this chamber is provided with electrical heating elements 26 which are controlled independently of the heating means in other portions of the apparatus by control means (not shown) and are preferably controlled independently one of another.

As shown in the modified form of Fig. 4, chamber P may be divided in two chambers P1 and P2 by a partition 27, similar to partition 21. These chambers are provided with chambers 28 and 29, respectively. In this modified form, the chamber 28 is adapted for the circulation of a cooling medium to aid in the cooling of the glass passing into the chamber P1, while chamber 29 is adapted to receive a heating medium from any suitable source (not shown) for the purpose of maintaining the glass at the suitable working temperature in the chamber P2.

In the use of either form of tempering or preparation chamber I propose that the heating and cooling means be controlled independently of the heating means in the other portions of the apparatus, it being my purpose to maintain throughout the apparatus an accurate control of the heat conditions.

The apparatus described is preferably much longer than it is wide. Without limiting my invention to these proportions, I prefer to use an apparatus in which the proportion of length to breadth is about 8 to 1 or 10 to 1. I propose that glass be maintained in chambers R and P in a comparatively shallow bath, for instance one from 4 to 18 inches in depth.

While my invention is not limited thereto I prefer to construct the walls, floor and roof of my apparatus of high grade refractories such as those referred to and described in the United States patent to Paul G. Willetts No. 1,605,885, patented November 2, 1926.

My preferred method of making glass with the use of the described apparatus is as follows: A suitable quantity of the batch is maintained in the hopper, whence it passes by gravity through the chute 13 to the passage 14 in front of the plunger or pusher 15 and is pushed into the melting chamber and under the pile 8 of melting batch in small quantities by the continuous operation of the pusher.

The melting chamber M is maintained at a suitable high temperature to rapidly and completely fuse the material from the top of the pile. As the batch melts it flows off from the pile and down the sloping floor of the melting chamber to the trough 11 in a thin stream or layer which is constantly subjected to the intense heat in the chamber. The melting chamber is maintained at the temperature best adapted to fusion of the particular glass at the desired rate.

By the time the glass has drained from the pile and traversed the chamber and chute, it has been completely fused and to some extent, freed of the gases resulting from the reaction of the original batch constituents. It passes down the chute and through the openings 12 and 22 into the "refining" chamber, where it is added to the shallow batch of glass therein.

In the refining chamber the diffusion of the silicates and the elimination of gases and air are completed. I have found that in my method and with my apparatus the refining operation can efficiently be carried on at a temperature somewhat lower than the efficient temperature of melting maintained in the melting chamber. I, therefore, maintain the temperature in the refining chamber at this lower but efficient refining temperature and I maintain the heat condition through any particular cross section of the refining chamber substantially uniform.

As the glass enters from the melting chamber into the refining chamber at the higher temperature, there is usually a downward heat gradient lengthwise or in the direction of flow of the glass in the refining chamber, but this is not objectionable so long as no portion of the glass is maintained at a substantially lower temperature than that which I have termed the efficient refining temperature. By means of my separate control of the heat conditions, I can readily maintain suitable temperatures throughout the refining chamber and avoid the objectionable upward gradient in the line of flow of the glass, the control of which in the tanks of the prior art is very difficult.

Because of the construction of the refining chamber, and the ability to control the heat conditions throughout it, and because of the comparatively shallow batch of glass used, I am enabled to substantially avoid, or at least greatly minimize, transverse convection currents, and am able to maintain each transverse cross section of glass in the chamber at uniform temperature throughout. Hence the glass moves through the refining chamber without noticeable channeling in a substantially full cross-sectional flow.

When the glass reaches the partition 21 between the refining and preparation chambers, it is completely refined, and save for its temperature and viscosity, is suitable for the manufacturing operation. Its temperature is then usually several hundred degrees higher than the temperature suitable to the manufacturing operation. The glass is passed from the refining chamber into the preparation chamber, where the heat conditions are separately maintained such that the glass is cooled uniformly of its transverse cross-section to and maintained at the temperature and viscosity required for the manufacturing operation. The provisions made in my apparatus are such that I maintain an accurate and complete control of the temperature conditions throughout the preparation chamber, without reference to the heat conditions in other chambers of the apparatus.

In tempering the glass, I may establish heating and cooling conditions such that the temperature of the glass drops uniformly from the partition to the work-out openings 23, arriving at the suitable temperature and viscosity only just prior to reaching the work-out openings, or I may provide for a rapid initial cooling of the glass to the working temperature or even slightly below that temperature, and then during the last portions of its flow toward the openings, bring it back to or maintain it at the working temperature by the suitable application of heat.

I have illustrated my invention as delivering glass to a single automatic feeder, diagrammatically shown by the forehearth 30 and the provision of such a single-unit tank is within the scope of my invention. However, it also includes the use of a plurality of automatic feeders on a single tank structure, or of a plurality of ring holes adapted for hand-working of the glass so made.

I have illustrated (in Fig. 3) and described a particular form of melting chamber and batch feeding means. My invention is not to be limited to the specific form there shown and may be efficiently carried out by the use of a differently arranged melting chamber having a greater or less floor gradient, or provided with a floor having a plurality of slopes of different inclinations and heated in another manner than that shown.

The glass may be fed to the chamber either in piles, as illustrated, or may be delivered in such manner as to be spread out in thin layers upon the floor of the chamber. The feed of batch is preferably, but not necessarily, an under-feed.

It is to be understood that the several operations of "melting" or "fusing", "refining" or "finishing", and "tempering" or "preparation", as those terms are here used, do not and cannot define glassmaking operations which are totally distinct and separated one from the other by any sharp line of division. The melting operation necessarily includes, in addition to the actual fusion of the glass, the beginnings of the refining operation, and the refining operation, as here described, often contains the beginnings of the tempering operation. In spite of this, however, the substantial distinctness of the operations is to be recognized, as is the separate control of the heat and flow conditions during these operations. It is through this separate control that my method and apparatus is primarily to be distinguished from the older and less efficient forms of continuous tanks.

The term "shallow bath" used in certain of the appended claims is to be understood as defining a bath of substantially less depth than that heretofore generally used in glass melting tanks. A bath ceases to be a shallow one within the meaning of such claims when it substantially exceeds 18 inches in depth.

The illustrated embodiment of the invention may be modified in construction, arrangement and mode of operation, without departing from the scope of the invention as defined in the appended claims.

What I claim is—

1. The process of making glass, which comprises the steps of fusing the glass batch in a melting compartment, passing the glass from said compartment into a refining compartment which is heat separated from the melting compartment, applying heat to the upper surface of the glass in the refining compartment, maintaining the glass in the refining compartment in a bath of such depth that the heat applied to its upper surface will maintain the glass throughout any vertical cross section of the bath at substantially the same temperature and fluidity, separately controlling the heat supplied to the melting compartment and the heat supplied to the refining compartment, and passing the refined glass into a separate tempering chamber.

2. In the process of making glass, the step of refining the glass which comprises maintaining a bath of molten glass in an insulated chamber lined with refractory material, the bath being of such depth that heat applied to the upper surface of the glass will maintain the glass throughout any vertical cross section at substantially the same temperature and fluidity, maintaining the glass at a refining temperature by the application of heat to the surface of the bath of glass therein, and controlling the heat conditions in the refining chamber to establish a heat gradient downwardly in the direction of the flow of glass therethrough while maintaining each transverse section of the glass at a substantially uniform temperature.

3. In the process of making glass, the step of fusing the glass which comprises maintaining a shallow batch of glass making material on the floor of a melting compartment by continuously feeding new batch beneath the surface of the batch, continuously fusing the top portion of said batch by the application of heat from an independently controlled heat source, and continuously removing the glass as fused from the compartment.

4. The process of making glass which comprises feeding a mixture of glass making materials into an insulated melting compartment, applying heat to the surface of the glass making materials to fuse the materials, flowing the glass resulting from such fusion into an insulated refining compartment, applying heat to the upper surface of the molten glass in the refining compartment, maintaining the glass in the refining compartment in a bath of such depth that the heat applied to its upper surface will maintain the glass throughout any vertical cross section of the bath at substantially the same temperature and fluidity, passing the refined glass into an insulated tempering compartment, maintaining the glass in the tempering compartment at a uniform temperature suitable for the glassware to be made, and separately controlling the temperatures in each of said compartments.

5. In glass making apparatus, a glass melting compartment adapted for movement adjacent to and away from a refining chamber and having a floor adapted to receive a batch of glass making materials, and to conduct the glass as melted to the refining chamber, means for feeding said glass making materials onto said floor and under the batch thereon, means for heating said compartment, and means for controlling the heat therein independently of the heat in other portions of the glass making apparatus.

6. The method of feeding glass batch to a melting furnace that comprises passing new batch under the batch already in the furnace.

7. The method of feeding glass batch to a melting furnace wherein the batch is melted by heat applied to its upper surface, that comprises feeding new batch under the batch exposed to the heat.

8. The method of feeding glass batch into a melting furnace that comprises, passing the batch into the furnace and shielding the batch during its passage thereto from the dynamic action of the gases in the furnace.

9. The method of continuously feeding glass batch into a furnace that comprises establishing a mass of batch upon the floor of the furnace, fusing the upper surface of the mass whereby a seal is formed over the lower portions of the mass and periodically feeding new batch under said melting surface.

10. The method of feeding glass batch in a furnace that comprises establishing a mass of batch upon the floor of the furnace, applying heat to the upper surface of the batch whereby the surface of the batch is fused and forms a temporary seal over the unfused batch below it, forcing new batch under the mass whereby internal disturbances are set up in the batch causing crevices in the seal.

11. The method of feeding glass batch into a melting tank, which comprises the step of feeding the unmelted batch under a film of melting batch.

12. The method of making glass which comprises feeding glass making batch into a container, melting the batch therein, forming a film of a part of the melting batch, continuously feeding additional unmelted batch under the film of melting batch, and allowing part of the melted batch to run off.

13. The process of making glass which comprises, continuously feeding glass batch to a melting chamber, fusing said batch by the application of heat of combustion, passing the glass out of the melting chamber and out of the influence of the heat therein into a refining compartment, passing the glass through said refining compartment in a stream of such depth that heat applied to the upper surface of the glass will maintain the glass throughout any vertical cross section of said stream at substantially the same temperature and fluidity, refining the glass therein by the application of heat to the upper surface of the glass in the refining compartment from separately controllable burners, regulating the application of heat to said stream to maintain substantially uniform the temperature of all portions of each cross section of the glass, passing the refined glass out of the refining compartment and out of the influence of heat therein in a stream of width substantially equal to the width of the refining compartment into a tempering or preparation chamber, tempering the glass therein, maintaining said tempering chamber and the glass therein at a uniform temperature suitable for the manufacture of glassware.

14. The method of continuously making glass in a melting tank which comprises maintaining a bath of glass in the tank, continuously supplying glass to the bath at one end thereof, applying heat of combustion to the upper surface of the glass to refine it and withdrawing glass from the bath at the other end thereof, and maintaining the depth of the bath such that the heat applied on its upper surface will maintain the glass throughout any vertical cross-section of the bath at substantially the same temperature and fluidity, whereby the glass will move toward the place of withdrawal in substantially full vertical cross-section.

15. In the process of making glass, the step of tempering the glass which comprises passing refined glass into a tempering chamber which is heat separated from the chambers wherein the glass is melted and refined in a stream of cross section substantially that of the glass in the tempering chamber, passing the stream through such chamber, uniformly cooling the glass to a working temperature, maintaining said glass uniformly at such temperature by the application of heat to the upper surface of the glass from within the tempering chamber, maintaining the depth of glass within the tempering chamber such that heat applied to its upper surface will maintain the glass throughout any vertical cross section of the bath at substantially the same temperature and fluidity, and controlling the heat condition therein independently of the heat in other portions of the glass making apparatus.

VERGIL MULHOLLAND.